United States Patent [19]

Segal

[11] Patent Number: 4,659,807

[45] Date of Patent: Apr. 21, 1987

[54] WATER-SOLUBLE PYRIDONE MONOAZO COMPOUNDS SUITABLE AS FIBER REACTIVE DYESTUFFS

[75] Inventor: Marcos Segal, Hofheim am Taunus, Fed. Rep. of Germany

[73] Assignee: Hoechst Aktiengesellschaft, Fed. Rep. of Germany

[21] Appl. No.: 757,687

[22] Filed: Jul. 22, 1985

[30] Foreign Application Priority Data

Jul. 24, 1984 [DE] Fed. Rep. of Germany ....... 3427188

[51] Int. Cl.⁴ .................... C09B 62/527; C09B 62/53; D06P 1/384; D06P 3/66
[52] U.S. Cl. ..................................... 534/642; 534/640
[58] Field of Search ................................ 534/642, 640

[56] References Cited

U.S. PATENT DOCUMENTS

| | | | |
|---|---|---|---|
| 3,926,944 | 12/1975 | Berrie | 534/642 X |
| 4,066,638 | 1/1978 | Fuchs | 534/642 X |
| 4,134,887 | 1/1979 | Fuchs | 534/642 X |
| 4,247,456 | 1/1981 | von Brachel et al. | 534/642 X |
| 4,305,874 | 12/1981 | Weaver et al. | 534/640 X |
| 4,430,259 | 2/1984 | Mischke et al. | 534/640 X |
| 4,564,672 | 1/1986 | Schlafer | 534/642 X |

FOREIGN PATENT DOCUMENTS

| | | | |
|---|---|---|---|
| 1924570 | 7/1977 | Fed. Rep. of Germany | 534/642 |
| 2254675 | 7/1975 | France | 534/642 |
| 1353474 | 5/1974 | United Kingdom | 534/642 |
| 1372527 | 10/1974 | United Kingdom | 534/642 |
| 2010882 | 7/1979 | United Kingdom | 534/642 |

*Primary Examiner*—Floyd D. Higel
*Attorney, Agent, or Firm*—Connolly and Hutz

[57] ABSTRACT

Monoazo compounds which are suitable as fiber-reactive dyestuffs have the general formula (1)

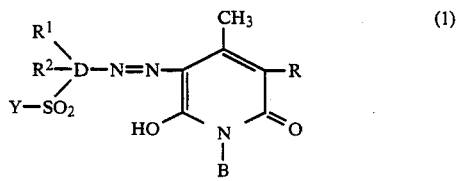

in which:

D is a benzene or naphthalene ring or a radical of the formula (2) or (3)

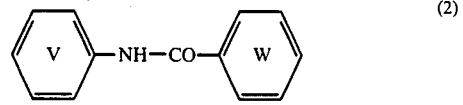

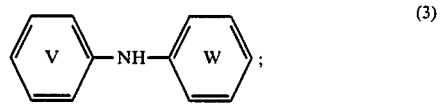

$R^1$ is hydrogen, alkyl of 1 to 4 carbon atoms, alkoxy of 1 to 4 carbon atoms, hydroxy, nitro or halogen, if D stands for a benzene ring, and $R^2$ is hydrogen, alkyl of 1 to 4 carbon atoms, alkoxy of 1 to 4 carbon atoms, halogen, carboxy or sulfo, if D stands for a benzene ring, or $R^1$ is hydrogen, alkyl of 1 to 4 carbon atoms, alkoxy of 1 to 4 carbon atoms, carboxy, halogen, sulfo or a group of the formula $-SO_2-Y$ (where Y has the meaning mentioned hereinafter), if D stands for a naphthalene ring, and $R^2$ is hydrogen or sulfo, if D is a naphthalene ring, or $R^1$ is, if D is a radical of the formula (2), hydrogen, nitro, chlorine or alkoxy of 1 to 4 carbon atoms, $R^1$ being bonded to the benzene nucleus V, and $R^2$ is, if D is a radical of the formula (2), chlorine, sulfo, nitro or hydrogen, $R^2$ being bonded to the benzene nucleus W, or $R^1$ is, if D is a radical of the formula (3), hydrogen, nitro or sulfo, $R^1$ being bonded to the benzene nucleus V, and $R^2$ is, if D is a radical of the formula (3), chlorine, sulfo or hydrogen, $R^2$ being bonded to the benzene nucleus W;

the group $-SO_2-Y$ in the formulae (2) and (3) is bonded to V or W, preferably to V;

Y is vinyl or ethyl which contains bonded in the β-position a substituent which is eliminatable as an anion under alkaline conditions;

R is hydrogen or carbamoyl,

B is alkyl of 1 to 4 carbon atoms which is substituted by sulfato, phosphato, carboxy or sulfo;

M is hydrogen or one equivalent of a monovalent, divalent or trivalent metal;

the moieties B, $R^1$, $R^2$ and R can have meanings which are identical to or different from one another.

The new monoazo compounds produce on hydroxy- and/or carboxamido-containing materials, in particular fiber materials, such as cellulose fibers and wool, useful dyeings and prints having good end-use and manufacturing fastness properties.

20 Claims, No Drawings

WATER-SOLUBLE PYRIDONE MONOAZO COMPOUNDS SUITABLE AS FIBER REACTIVE DYESTUFFS

The invention relates to the technical field of fiber-reactive dyestuffs.

British Patent Specification No. 1,372,527 and British Patent Application No. 2,010,882 A disclose pyridone monoazo dyestuffs whose dyeings do not have adequate alkali fastness: alkalis, such as sodium carbonate, cause color changes. Furthermore, these azo dyestuffs are difficult to prepare in single form using the 3-sulfopyridone coupling component, since the bond to the sulfo group present in the 3-position is labile to acid.

The dyeings of pyridone monoazo dyestuffs described in German Auslegeschrift No. 1,924,570 likewise have inadequate alkali fastness, and their light fastness is likewise unsatisfactory.

The present invention now presents new monoazo compounds of the general formula (1)

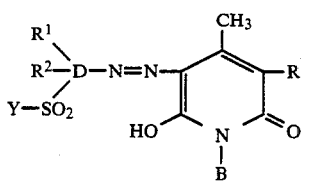

which surprisingly have improved fastness properties.

In this formula (1):

D is a benzene ring or a naphthalene ring or a radical of the formula (2) or (3)

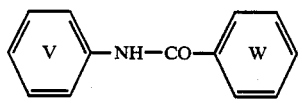

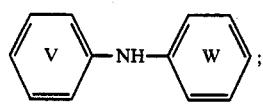

$R^1$ is a hydrogen atom, an alkyl group of 1 to 4 carbon atoms, such as an ethyl group and in particular a methyl group, an alkoxy group of 1 to 4 carbon atoms, such as an ethoxy group and in particular a methoxy group, a hydroxy group, a nitro group or a halogen atom, such as a chlorine atom or in particular a bromine atom, if D stands for a benzene ring, and $R^2$ is a hydrogen atom, an alkyl group of 1 to 4 carbon atoms, such as an ethyl and in particular a methyl group, an alkoxy group of 1 to 4 carbon atoms, such as an ethoxy group and in particular a methoxy group, a halogen atom, such as a chlorine atom or in particular a bromine atom, a carboxy group (of the general formula —COOM where M has the meaning mentioned hereinafter) or a sulfo group, if D stands for a benzene ring, or $R^1$ is a hydrogen atom, an alkyl group of 1 to 4 carbon atoms, such as an ethyl group and in particular a methyl group, an alkoxy group of 1 to 4 carbon atoms, such as an ethoxy group and in particular a methoxy group, a carboxy group or a halogen atom, such as a chlorine atom or in particular a bromine atom, or preferably a sulfo group (of the general formula —$SO_3M$ where M has the meaning mentioned hereinafter) or a group of the formula —$SO_2$—Y (where Y has the meaning mentioned hereinafter), if D stands for a naphthalene radical, and $R^2$ is a hydrogen atom or preferably a sulfo group, if D is a naphthyl radical, or $R^1$ is, if D is a radical of the formula (2), a hydrogen atom, a nitro group, a chlorine atom or an alkoxy group of 1 to 4 carbon atoms, such as in particular a methoxy group, $R^1$ being bonded to the benzene nucleus V, and $R^2$ is, if D is a radical of the formula (2), a chlorine atom, a sulfo group or a nitro group or preferably a hydrogen atom, $R^2$ being bonded to the benzene nucleus W, or $R^1$ is, if D is a radical of the formula (3), a hydrogen atom, a nitro group or a sulfo group, $R^1$ being bonded to the benzene nucleus V, and $R^2$ is, if D is a radical of the formula (3), a chlorine atom or a sulfo group or preferably a hydrogen atom, $R^2$ being bonded to the benzene nucleus W;

the group —$SO_2$—Y in the formulae (2) and (3) is bonded to V or W, preferably to V;

Y is a vinyl group or an ethyl group which contains in the β-position a substituent which is eliminatable as an anion under alkaline conditions, such as, for example, a β-thiosulfatoethyl group (of the general formula —$CH_2$—$CH_2$—S—$SO_3M$ where M has the meaning mentioned hereinafter), a β-phosphatoethyl group (of the general formula —$CH_2$—$CH_2$—$OPO_3M_2$ where M has the meaning mentioned hereinafter), a β-chloroethyl group, a β-($C_2$–$C_5$-alkanoyloxy)-ethyl group, such as a β-acetyloxyethyl group and preferably a β-sulfatoethyl group (of the general formula —$CH_2$—$CH_2$—$OSO_3M$ where M has the meaning mentioned hereinafter);

R is a hydrogen atom or a carbamoyl group;

B is an alkyl group of 1 to 4 carbon atoms, such as a methyl group and propyl group and in particular an ethyl group which is substituted by a sulfato group (of the general formula —$OSO_3M$ where M has the meaning mentioned hereinafter), a phosphato group (of the general formula $OPO_3M_2$ where M has the meaning mentioned hereinafter), a carboxy group or a sulfo group;

M is a hydrogen atom or one equivalent of a monovalent, divalent or trivalent metal, in particular of an alkali metal or alkaline earth metal, such as of sodium, potassium, lithium or calcium;

the moieties B, $R^1$, $R^2$ and R can have meanings which are identical to or different from one another.

Of the compounds of the general formula (1) which are in accordance with the invention, particular attention is drawn to those in which the moiety A represents a 2-naphthyl radical or $R^2$ is a carboxy group or sulfo group or $R^1$ denotes a hydrogen atom, or which contain these preferred groups in combined form. Similar preference is given to those compounds according to the invention in which the moiety Y denotes a vinyl group and is in particular a β-sulfatoethyl group. Preference is also given to those compounds in which R stands for a hydrogen and/or in which B is a sulfo- or carboxy-substituted alkyl group of 1 to 3 carbon atoms or denotes in particular a β-sulfoethyl group.

If D is a phenyl radical, the group —$SO_2$—Y is preferably bonded in the meta- or para-position relative to the azo group.

Particular preference is given to those monoazo compounds according to the invention which have the general formula (4a) or (4b) or (4c)

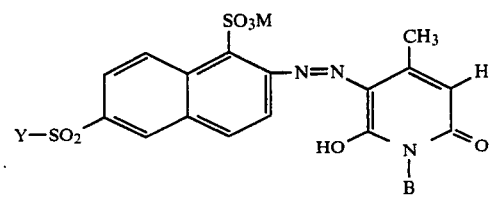

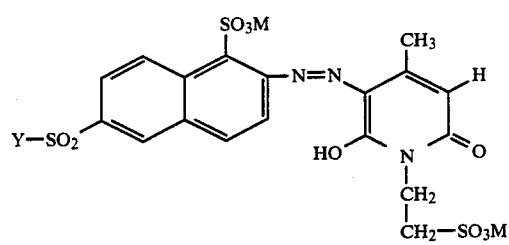

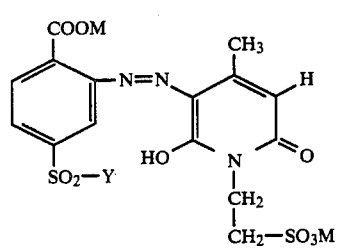

in which B, M and Y have the abovementioned meanings, in particular the preferred meanings.

The new azo compounds can be present not only in acid form but also in the form of their salts. They are preferably in the form of the salts, in particular the alkali metal and alkaline earth metal salts, and they are also preferably used in this form for dyeing (to be understood here and hereinafter in the general sense and as including printing) hydroxyl- and/or carboxamido-containing materials, in particular fiber materials.

The present invention also relates to processes for preparing the abovementioned and defined compounds of the general formula (1). These processes comprise coupling a diazonium compound of an amine of the general formula (5)

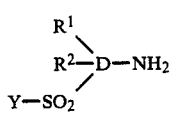

in which $R^1$, $R^2$ and Y have the abovementioned meanings, with a pyridone compound of the general formula (6)

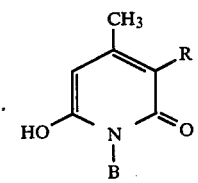

in which R and B have the abovementioned meanings, or converting an azo compound of the general formula (7)

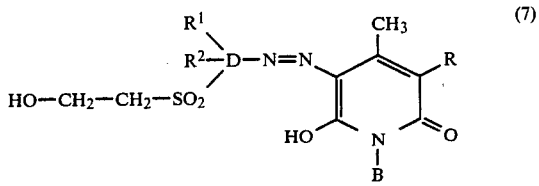

in which $R^1$, $R^2$, R, B and D have the abovementioned meanings, analogously to known procedures by means of an esterification or acylation agent for the end compound of the general formula (1) into a compound of the general formula (1) in which Y stands for an ethyl group which is substituted in the β-position by an ester group, such as, for example, a lower alkanoyloxy group, a sulfato group or a phosphato group. Esterification and acylation agents are for example acetyl chloride, glacial acetic acie, acetic anhydride, polyphosphoric acid, phosphorus oxychloride and phosphorus pentachloride and the sulfating agents mentioned hereinafter. This is because the preferred form of esterification is sulfation, i.e. the conversion of the β-hydroxyethyl group of the compound of the formula (7) into a β-sulfatoethyl group, which can be carried out analogously to numerous procedures described in the literature. Sulfating agents are preferably concentrated sulfuric acid and sulfuric acid containing sulfur trioxide (oleum).

Compounds of the general formula (1) in which R stands for a carbamoyl group and Y denotes a β-sulfatoethyl group and which are to be prepared according to the last procedure, namely by sulfation of an appropriate compound of the general formula (7), can also be synthesized in a manner according to the invention by sulfation of a compound of the general formula (8)

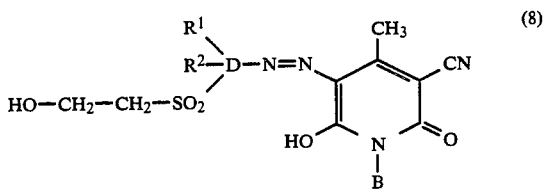

in which $R^1$, $R^2$, D and B have the abovementioned meanings, by means of 96 to 99% strength sulfuric acid. In this sulfation reaction, the cyano group in the pyridone component is readily hydrolized into a carbamoyl group. This procedure can be carried out in accordance with Houben-Weyl, Methoden der organischen Chemie [Methods of organic Chemistry], Volume VIII/3 (1952), page 662; the reaction temperature used therein is between 0° and 80° C., preferably between 30° and 60° C.

The same method can be used to prepare compounds of the general formula (1) according to the invention in which Y stands for a β-sulfatoethyl group, B stands for a sulfato-substituted alkyl group of 1 to 4 carbon atoms, in particular a β-sulfatoethyl group, and R is a carbamoyl group, by sulfation and simultaneous hydrolysis of the cyano group of a compound of the general formula (9)

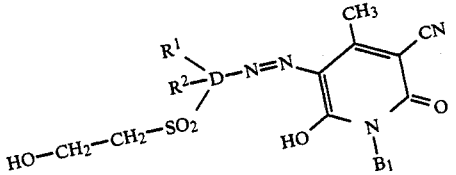

in which $R^1$, $R^2$ and D have the abovementioned meanings and $B_1$ is a hydroxyalkyl group, preferably a β-hydroxyethyl group, at 0° to 80° C., preferably 30° to 60° C., by means of 96 to 99% strength sulfuric acid.

The diazo and coupling components used as starting compounds are known. The β-hydroxyethylsulfonyl-azo compound of the general formula (7) can be obtained by appropriate reaction of the diazotized amine of the general formula (5) in which Y however stands for a β-hydroxyethyl group with the coupling component of the general formula (6). The diazotization of the amines of the general formula (5) can be effected analogously to well established procedures, for example by means of nitrous acid in a strongly acid, aqueous organic and especially purely aqueous medium (such as at a pH between 0 and 2). Similarly, the reaction of these diazonium compounds with the pyridone compounds of the general formula (6) will be carried out in accordance with the known procedures, for example in an aqueous organic, predominantly in a purely aqueous medium, in a weakly acid or neutral (such as at a pH between 4 and 7), or if desired in a very weakly alkaline pH range (such as for example at a pH of up to 8). In this reaction it is necessary to take care that the fiber-reactive group is not damaged by an excessively alkaline range.

Examples of amino compounds of the general formula (5) are 1-amino-4-(β-sulfatoethylsulfonyl)-benzene, 1-amino-3-(β-sulfatoethylsulfonyl)-benzene, 1-amino-2-(β-sulfatoethylsulfonyl)-benzene, 1-amino-methoxy-5-(β-sulfatoethylsulfonyl)-benzene, 1-amino-2-hydroxy-5-(β-sulfatoethylsulfonyl)-benzene, 1-amino-2-hydroxy-4-(β-sulfatoethylsulfonyl)-benzene, 1-amino-2-methyl-4-(β-sulfatoethylsulfonyl)-benzene, 1-amino-2-methoxy-5-methyl-4-(β-sulfatoethylsulfonyl)-benzene, 1-amino-2,5-dimethoxy-4-(β-sulfatoethylsulfonyl)-benzene, 1-amino-2-methyl-1-amino-5-(β-sulfatoethylsulfonyl)-benzene, 2-chloro-1-amino-5-(β-sulfatoethylsulfonyl)-benzene, 2-sulfo-1-amino-5-(β-sulfatoethylsulfonyl)-benzene, 2-carboxy-1-amino-5-(β-sulfatoethylsulfonyl)-benzene, 1-amino-4-chloro-5-(β-sulfatoethylsulfonyl)-benzene, 1-amino-2-bromo-4-(β-sulfatoethylsulfonyl)-benzene, 1-amino-4-[2'-nitro-4'-(β-sulfatoethylsulfonyl)-phenylamino]-benzene, 1-amino-4-[4'-nitro-2'-(β-sulfatoethylsulfonyl)-phenylamino]-benzene, 1-amino-4-[3'-(β-sulfatoethyl-sulfonyl)-benzoylamino]-naphthalene, 2-amino-1-sulfo-6-(β-sulfatoethylsulfonyl)-naphthalene, 1-amino-6-sulfo-4-(β-sulfatoethylsulfonyl)-naphthalene, 1-amino-7-sulfo-5-(β-sulfatoethylsulfonyl)-naphthalene, 1-amino-4-sulfo-6-(β-sulfatoethylsulfonyl)-naphthalene, 2-sulfo-7-(β-sulfatoethylsulfonyl)-naphthalene, amino-1-sulfo-5-(β-sulfatoethylsulfonyl)-naphthalene, 2-amino-1,7-disulfo-5-(β-sulfatoethylsulfonyl)-naphthalene, 2-amino-8-sulfo-6-(β-sulfatoethylsulfonyl)-naphthalene, 1-amino-4-(β-sulfatoethylsulfonyl)-naphthalene, 1-amino-5-(β-sulfatoethylsulfonyl)-naphthalene, 1-amino-6-(β-sulfatoethylsulfonyl)-naphthalene, amino-7-(β-sulfatoethylsulfonyl)-naphthalene, 3,6-di-(β-sulfatoethylsulfonyl)-naphthalene, 2-amino-ethoxy-6-(β-sulfatoethylsulfonyl)-naphthalene, 2-amino-5-(β-sulfatoethylsulfonyl)-naphthalene, 2-amino-7-(β-6-(β-sulfatoethylsulfonyl)-naphthalene, 2-amino-8-(β-sulfatoethylsulfonyl)-naphthalene, 2-amino-6,8-di-(β-sulfatoethylsulfonyl)-naphthalene and 2-amino-4,8-di-(β-sulfatoethylsulfonyl)-naphthalene and for example their corresponding β-thiosulfatoethylsulfonyl, β-phosphatoethylsulfonyl, β-chloroethylsulfonyl, β-acetoxyethylsulfonyl and vinylsulfonyl derivatives.

Examples of pyridone compounds of the general formula (6) are 1-(β-sulfatoethyl)-4-methyl-6-hydroxy-2-pyridone, 1-(β-phosphatoethyl)-3-carbamoyl-4-methyl-6-hydroxy-2-pyridone, 1-carboxymethyl-3-carbamoyl-4-yl-6-hydroxy-2-pyridone, 1-(β-sulfatoethyl)-3-carbamoyl-4-hydroxy-2-pyridone, 1-(β-carboxyethyl)-3-methyl-6-hydroxy-2-pyridone, 1-(β-carboxyethyl)-3-methyl-6-hydroxy-2-pyridone, 1-(β-sulfo-methyl-4-carbamoyl-4-methyl-6-hydroxy-2-pyridone, 1-carbamoyl-4-methyl-6-hydroxy-2-pyridone, 1-(β-sulfatoethyl)-3-carbamoyl-4-methyl-6-hydroxy-2-pyridone, 1-(β-phosphatoethyl)-3-carbamoyl-4-methyl-6-hydroxy-2-pyridone, 1-carboxymethyl-3-carbamoyl-4-methyl-6-hydroxy-2-pyridone and 1-carboxymethyl-6-hydroxy-2-pyridone.

The compounds of the general formula (1) which are prepared in accordance with the invention can be precipitated and isolated from the synthesis solution by methods which are common knowledge, for example, either by precipitation from the reaction medium by means of electrolytes, such as, for example, sodium chloride or potassium chloride, or by evaporating the reaction solution—to which a buffer substance may be added—to dryness, for example in the form of spray drying.

The compounds of the general formula (1) with the invention have fiber-reactive properties and very good dyestuff properties. In accordance with the invention they can therefore be used for dyeing (including printing) hydroxy-containing and/or carboxamido-containing materials. Even the solutions obtained in the synthesis of the compounds according to the invention, if necessary after addition of a buffer substance and if necessary after concentration, can be directly used in dyeing in the form of liquid preparations (compositions).

The present invention therefore also relates to the use of the compounds of the general formula (1) of the instant invention for dyeing (including printing) hydroxy- and/or carboxamide-containing materials, and/or to a process for their application to such substrates. Preferably the materials are used in the form of fiber materials, in particular in the form of textiles, such as yarns, wound packages and fabrics. Application can be analogous to known procedures.

Hydroxy-containing materials are, for example, of natural or synthetic origin, such as, for example, cellulose fiber materials or their regenerated products, and polyvinyl alcohols. Cellulose fiber materials are preferably cotton, but can also be other vegetable fibers, such as linen, hemp, jute and ramie fibers; examples of regenerated cellulose fibers are staple viscose and filament viscose.

Examples of carboxamido-containing materials are synthetic and natural polyamides and polyurethanes, in particular in the form of fibers, for example wool and other animal hairs, silk, leather, polyamide-6,6, polyamide-6, polyamide-11 and po acid-binding agents are sodium hydroxide, potassium hydroxide, sodium carbonate, sodium bicarbonate, potassium carbonate, sodium formate, sodium dihydrogenphosphate, disodium hydrogenphosphate, sodium trichloroacetate, sodium silicate and trisodium phosphate.

The treatment of the compounds according to the invention (dyestuffs) with the acid-binding agents, optionally under heat, has the effect of chemically bonding the dyestuffs according to the invention to the cellulose fiber; cellulose dyeings in particular have excellent wet fastness properties after the customary aftertreatment of rinsing for removing unfixed dyestuff portions, in particular since unfixed dyestuff portions are readily washed off.

The dyeings on polyurethane or natural or synthetic polyamide fibers are customarily carried out from an acid medium. For instance, it is possible to add to the dyebath acetic acid and/or ammonium sulfate and/or acetic acid and ammonium acetate in order to obtain the desired pH. To obtain utilizable levelness for the dyeing, it is advisable to add a customary leveling assistant, such as, for example, based on a reaction product of cyanuric chloride with three times the molar amount of aminobenzenesulfonic acid and/or of an aminonaphthalenesulfonic acid or based on a reaction product of for example stearylamine with ethylene oxide. As a rule, the material to be dyed is introduced into the bath at a temperature of about 40° C. and is agitated therein for some time, the dyebath is then adjusted to the desired weakly acid, preferably weakly acetic acid, pH, and the actual dyeing is carried out at a temperature between 60° and 98° C. However, the dyeings can also be carried out at the boil or at temperatures of up to 120° C. (under pressure).

The dyeings and prints prepared with the compounds of the general formula (1) which are in accordance with the invention are generally distinguished by bright greenish to reddish yellow to yellowish orange shades and high tinctorial strength. They can be combined particularly advantageously with known blue fiber-reactive phthalocyanine dyestuffs which have valuable properties, in order to produce green combination shade dyeings.

The dyeings and prints have, in particular on cellulose fiber materials, a very good light fastness and good to very good wet fastness properties, such as, for example, a good chlorinated water fastness, good to very good wash fastness properties at 60° to 95° C., including in the presence of perborates, acid and alkaline fulling, cross-dyeing and perspiration fastness properties, alkali, acid, water and sea-water fastness properties, alkali, good pleating fastness, hot press fastness and rub fastness. They also have very good resistance to acid fading when stored in the form of moist dyed material still containing acetic acid.

Also of importance is the use according to the invention of the compounds of the general formula (1) for the fiber-reactive dyeing of wool. In particular, dyeings having very good fastness properties can even be obtained on wool having a non-felting or low-felting finish (cf. for example H. Rath, Lehrbuch der Textilchemie "Textbook of Textile Chemistry", Springer-Verlag, 3rd edition (1972), pages 295-299, in particular the finish by the so-called Hercosett method (page 298); J. Soc. Dyers and Colourists 1972, 93–99, and 1975, 33–44).

The method of dyeng on wool is effected in this case in customary and known manner, namely by subjecting The compounds of the formula (1) according to the invention can be applied and fixed to the substrates mentioned, in particular to the fiber materials mentioned, in accordance with the invention and using the application techniques known for water-soluble dyestuffs, in particular for fiber-reactive dyestuffs,—for example by applying a monoazo compound of the general formula (1) in dissolved form to or into the substrate and fixing it thereon or therein, through the action of heat and/or through the action of an alkaline agent. These dyeing and fixing methods are described in the literature in large number.

For instance, if applied to cellulose fibers by the exhaustion methods from long liquor using all manner of acid-binding agents and optionally neutral salts, such as sodium chloride or sodium sulfate, they produce very good color yields and an excellent color buildup. Dyeing preferably takes place at temperatures between 40° and 80° C., if desired at temperatures of up to 120° C. under pressure, in an aqueous bath and in the presence or absence of customary dyeing assistants. Dyeing temperatures as low as 40° C. already produce very good color yields.

One possible procedure is introducing the material into the warm bath and gradually raising the latter to the desired dyeing temperature, and completing the dyeing process at this temperature. The neutral salts which accelerate the exhaustion of the dyestuff can also, if desired, be added to the bath only when the actual dyeing temperature has been attained.

Padding likewise produces excellent color yields and very good color buildup on cellulose fibers, it being possible to fix the dyestuff in conventional manner by leaving the dyeing to stand at room temperature or elevated temperature, for example at up to about 60° C., by steaming or by means of dry heat.

White ground prints having well defined contours and a white ground are likewise obtained by the customary printing methods for cellulose fibers, which can be carried out in one-step form, for example by printing with a print paste containing the compound according to the invention and sodium bicarbonate or another acid-binding agent and subsequently steaming at 100° to 103° C., or in two-step form, for example by printing with a neutral weakly acid printing paste containing the compound according to the invention and subsequently passing the printed material through a hot alkali- and electrolyte-containing bath or by overpadding with an alkali-containing padding liquor and subsequently leaving this overpadded material to stand or subjecting it to heat treatment with dry heat. The outcome of the prints depends only little upon varying fixing conditions of dry heat in the customary thermal fixing effected with hot air of 120° to 200° C. In addition to customary steam at 101° to 103° C. it is also possible to use superheated steam and compressed steam at temperatures of up to 160° C.

The acid-binding agents which have an acid-binding action and effect the fixation of the compounds of the formula (1) to be fixed to the fibers, are for example water-soluble basic salts of the alkali metals and alkaline earth metals of organic or inorganic acids or compounds which liberate alkali on heating. Examples are the alkali metal hydroxides and alkali metal salts of weak to medium strength inorganic acids, preferably their sodium and potassium compounds. Examples of such the fiber-reactive compound of the general formula (1) to exhaustion, preferably at first from an acid dyebath having a pH of about 3.5 to 5.5, with control of the pH and toward the end of dyeing time shifting the pH into the neutral and if desired weakly alkaline range up to a pH of 8.5, in order to obtain the full reactive bond between this dyestuff of the formula (1) and the fiber, in particular if it desired to obtain high depth of shade. At the same time the dyestuff portion which is not reactively bonded is dissolved off.

The procedure described here also applies to the preparation of dyeings on fiber materials made of other natural polyamides or made of synthetic polyamides and polyurethanes. The dyeings are carried out at temperatures of 60° to 100° C., but they can also be carried out in sealed dyeing machines at temperatures of up to 160° C. Since the compounds of the general formula (1) are very readily water-soluble, they can also be used advantageously in conventional continuous dyeing methods. The tinctorial strength of the compounds of the general formula (1) which are in accordance with the invention is very high. On fiber materials, in particular in the reactive dyeing of wool, they produce bright greenish to reddish yellow to yellowish orange dyeings. If applied at dyeing temperatures of 100° to 106° C. the bath exhaustion is found to be high.

In the case of the dyeings obtainable with the compounds of the general formula (1) which are in accordance with the invention, it is possible to dispense with the otherwise customary ammoniacal aftertreatment of the dyed material. Unlike structurally similar known dyestuffs they surprisingly have a very good color buildup, the brilliant hue being retained in deep shades. They are moreover highly compatible with other fiber-reactive wool dyestuffs which permit a surprisingly level dyeing of the fiber. Similarly, material made of wool fibers of different origins can be dyed level with the compounds according to the invention. To improve the leveling properties, it is possible, if desired, to add a customary leveling assistant, such as, for example, N-methyltaurine.

If the customary dyeing assistants which have affinity for the fiber are used, the compounds according to the invention also produce level dyeings on wool having a non-felting or low-felting finish. In the case of pale to medium depths of shade a very good wet fastness level can even be obtained without ammoniacal aftertreatment, although in certain circumstances an ammoniacal aftertreatment can be preferable. Aside from the high light fastness of these wool dyeings attention is also drawn to the very good wet fastness properties, in particular the excellent alkaline perspiration fastness and very good washing fastness at 60° C., even of dyeings in high depths of shade.

The examples which follow serve to illustrate the invention. The parts and percentages are by weight, unless otherwise stated. Parts by weight relate to parts by volume as the kilogram relates to the liter.

The compounds described in the examples in the form of formulae are shown in the form of free acids; they are generally prepared and isolated in the form of their sodium or potassium salts and used in the form of their salts for dyeing. In the same way, the starting compounds and components mentioned in the examples below, in particular the tabulated examples, in the form of the free acid can be used in the synthesis as such or in the form of their salts, preferably alkali metal salts, such as sodium or potassium salts.

EXAMPLE 1

140 parts of 4-(β-sulfatoethylsulfonyl)-aniline are dissolved in 500 parts of water by means of 33 parts of sodium carbonate. Addition of 300 parts of ice and 111 parts of 31% strength aqueous hydrochloric acid is followed by diazotization by means of an aqueous solution of 34.5 parts of sodium nitrite. After 1 hour stirring excess nitrous acid is destroyed with sulfamic acid, and a weakly acid solution of 117 parts of 1-(2-sulfoethyl)-4-methyl-6-hydroxy-2-pyridone in 300 parts of water is added; during this coupling reaction the pH is maintained between 5 and 5.5 with sodium bicarbonate.

The monoazo compound according to the invention is isolated from the aqueous synthesis solution in conventional manner for water-soluble dyestuffs, for example by evaporating the very weakly acid to neutral solution to dryness, by spray-drying or by salting out with an electrolyte salt, such as potassium chloride or sodium chloride. The isolated material is a yellow powder which contains an alkali metal salt, such as the sodium or potassium salt, of the compound of the formula

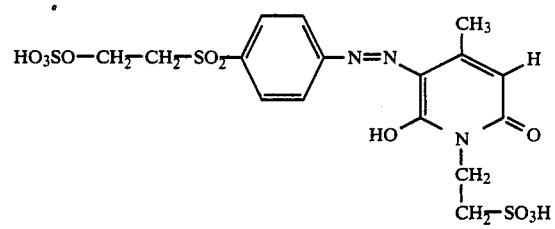

The azo compound according to the invention has in aqueous solution a visible absorption range maximum at 411 nm. It has very good dyestuff properties and produces for example on cotton by the application and fixing methods customary in the industry, in particular those for fiber-reactive dyestuffs, strong greenish yellow dyeings and prints of good light and wet fastness properties, such as, for example, good wash fastness properties, good alkaline and acid fulling, cross-dyeing and perspiration fastness properties and good alkali and acid fastness properties.

EXAMPLE 2

To prepare a monoazo compound according to the invention the instructions of Example 1 are followed, except that the 4-(β-sulfatoethylsulfonyl)-aniline is replaced by an equivalent amount of 2-methoxy-5-methyl-4-(β-sulfatoethylsulfonyl)-aniline.

Working up of the synthesis solution and isolation gives an electrolyte-containing powder which contains an alkali metal salt of the compound of the formula

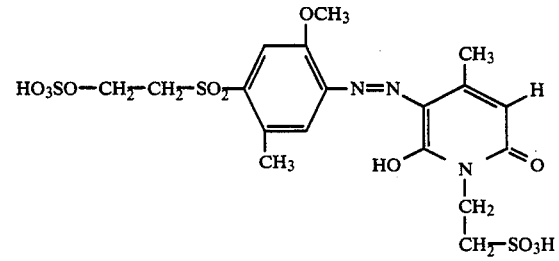

which in aqueous solution has an absorption maximum at 432 nm and dyes for example cellulose fiber materials, such as cotton, in fast yellow shades.

EXAMPLE 3

32.5 parts of 2-carboxy-5-(β-sulfatoethylsulfonyl)-aniline are added to 280 parts of ice-water. Addition of 26 parts of 31% strength aqueous hydrochloric acid is followed by diazotization with 5n sodium nitrite solution and vigorous stirring. Excess nitrous acid is decomposed after 1 hour with sulfamic acid; the reaction mixture is coupled with a neutral solution of 24 parts of 1-(2-carboxyethyl)-3-carbamoyl-4-methyl-6-hydroxy-2-pyridone in 200 parts of water. During this coupling reaction the pH is held between 5 and 5.5 with sodium bicarbonate.

Conventional working up of the synthesis solution and isolation gives an electrolyte-containing powder which contains an alkali metal salt, such as, for example, the sodium salt, of the compound of the formula

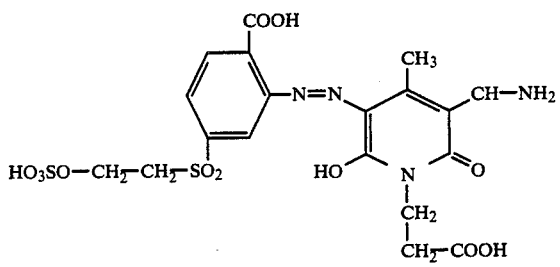

which in aqueous solution has a visible absorption range maximum at 418 nm. It has very good dyestuff properties and produces on the materials mentioned in the description, such as in particular cellulose fiber materials, for example cotton, by the application and fixing methods, customary in industry, in particular for fiber-reactive dyestuffs, strong greenish yellow dyeings and prints of good light fastness and of good wet fastness properties, such as, for example, in particular good wash fastness properties, good alkaline and acid fulling, cross-dyeing and perspiration fastness properties and a good chlorinated water fastness.

EXAMPLE 4

41.1 parts of 6-(β-sulfatoethylsulfonyl)-1-sulfo-2-naphthylamine were suspended in 400 parts of ice-water, 30 parts of 31% strength aqueous hydrochloric acid were added, and rapid diazotization carried out with a 5n sodium nitrite solution. Stirring is continued for 1 hour and excess nitrous acid is then decomposed with sulfamic acid. The reaction mixture has added to it a weakly acid solution of 23.3 parts of 1-(2-sulfoethyl)-4-methyl-6-hydroxy-2-pyridone in 100 parts of water; during this coupling reaction the pH is held between 5 and 5.5 with sodium bicarbonate.

Conventional working up of the synthesis solution and isolation gives an electrolyte-containing powder containing an alkali metal salt, such as, for example, the sodium salt, of the compound of the formula

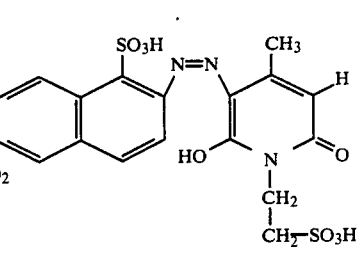

which in aqueous solution has a visible absorption range maximum at 420 nm. It has very good dyestuff properties and produces on the materials mentioned in the description, such as, in particular, cellulose fiber materials, for example cotton, by the application and fixing methods customary in industry, in particular for fiber-reactive dyestuffs, greenish yellow dyeings and prints of good light fastness and of good wet fastness properties, such as, in particular, good alkali, wash, fulling, cross-dyeing, chlorinated water and perspiration fastness properties.

EXAMPLE 5

100.5 parts of 4-(β-hydroxyethylsulfonyl)-aniline are dissolved in 500 parts of water by means of 300 parts of 31% strength aqueous hydrochloric acid. Addition of 300 parts of ice is followed by diazotization by means of an aqueous solution of 34.5 parts of sodium nitrite, and excess nitrous acid is subsequently decomposed in conventional manner. To the reaction mixture is added a weakly acid solution of 117 parts of 1-(2-sulfoethyl)-4-methyl-6-hydroxy-2-pyridone in 300 parts of water; during this coupling reaction the pH is held between 5 and 5.5 with sodium bicarbonate.

Conventional working up of the synthesis solution and isolation gives an electrolyte-containing powder containing an alkali metal salt, such as, for example, the sodium salt, of the compound of the formula

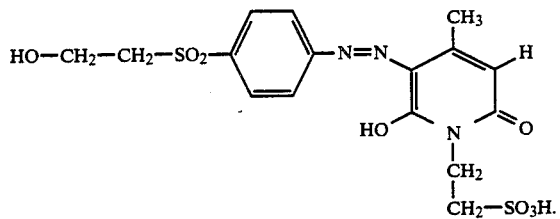

The dry and milled yellow dyestuff powder is added to 1,100 parts of concentrated sulfuric acid, and the mixture is stirred at room temperature for 6 hours. Subsequently the resulting solution is poured onto a mixture of ice and sodium chloride, and the precipitated ester dyestuff is filtered off and washed with an aqueous sodium chloride solution. Drying leaves a salt-containing yellow dyestuff powder of the compound described in Example 1, which has equally good dyeing properties.

EXAMPLE 6

To prepare a monoazo compound according to the invention the instructions of Example 5 are followed, except that the 1-(2-sulfoethyl)-4-methyl-6-hydroxy-2-pyridone is replaced by an equivalent amount of 1-(2-carboxyethyl)-3-cyano-4-methyl-6-hydroxy-2-pyridone.

Working up of the synthesis solution and isolation gives an electrolyte-containing powder containing an alkali metal salt of the compound of the formula

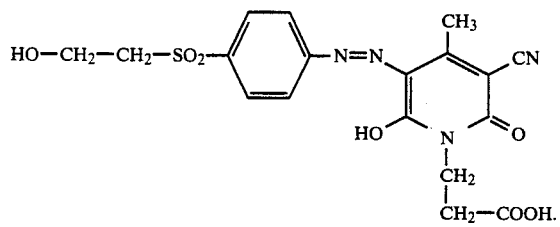

The dry and milled dark yellow powder is added to 1,100 parts of concentrated sulfuric acid, and the mixture is stirred at 55° C. for 24 hours. Subsequently the resulting solution is poured onto a mixture of ice and potassium chloride, and the precipitated ester dyestuff is filtered off and resuspended in water. This suspension is brought to pH 5.0 with sodium bicarbonate, and the dyestuff is again salted out with potassium chloride and isolated. Drying leaves a yellow powder of the compound of the formula

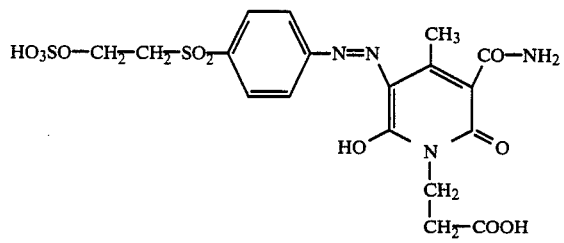

in the form of its sodium and potassium salt. In aqueous solution it has an absorption maximum at 417 nm and dyes for example cellulose fiber materials, such as cotton, in fast greenish yellow shades.

EXAMPLE 7

147.5 parts of 1-methoxy-5-($\beta$-hydroxyethylsulfonyl)-aniline are diazotized in accordance with the instructions of Example 5, and a weakly acid solution of 97 parts of 1-(2-hydroxyethyl)-3-cyano-4-methyl-6-hydroxy-2-pyridone in 350 parts of water is added. During this coupling reaction the pH is held between 5 and 5.5 with sodium bicarbonate.

After the working-up of the synthesis solution the isolated electrolyte-containing azo compound is dried and ground. The yellow powder is added to 1,100 parts of concentrated sulfuric acid, the mixture is stirred at 55° C. for 24 hours. Subsequently the resulting solution is poured onto a mixture of ice and potassium chloride, and the precipitated ester dyestuff is filtered off and resuspended in water. This suspension is brought to pH 5.0 with sodium bicarbonate, and the dyestuff is again salted out with potassium chloride. Drying leaves a yellow powder which contains the compound of the formula

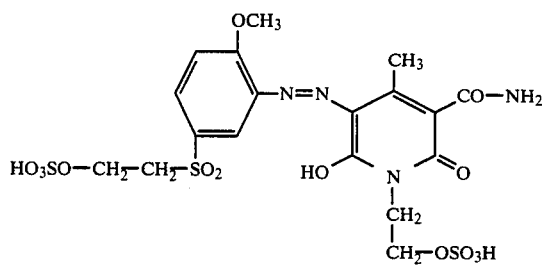

in the form of its sodium and potassium salt. In aqueous solution it has an absorption maximum at 432 nm and dyes for example cellulose fiber materials, such as cotton, in fast yellow shades.

EXAMPLES 8 TO 38

The tabulated examples below give further monoazo compounds according to the invention in terms of their diazo and coupling components, which can be prepared in accordance with the invention, i.e. analogously to the preceding examples, and are useful dyestuffs having fiber-reactive properties. On the materials mentioned in the description, such as in particular, cellulose fiber materials, for example cotton, they produce strong dyeings and prints having good fastness properties and the hue indicated in the respective tabulated example for the dyeing on cotton. The absorption maxima ($\lambda_{max}$) were measured in aqueous solution.

| Example | Amine of the general formula (5) | Pyridone compound of the general formula (6) | Hue on cotton ($\lambda_{max}$ in nm) |
|---|---|---|---|
| 8 | 4-($\beta$-sulfatoethylsulfonyl)-aniline | 1-(2-sulfoethyl)-3-carbamoyl-4-methyl-6-hydroxy-2-pyridone | greenish yellow (415) |
| 9 | 4-vinylsulfonyl-aniline | 1-(2-sulfoethyl)-3-carbamoyl-4-methyl-6-hydroxy-2-pyridone | greenish yellow (415) |
| 10 | 3-($\beta$-sulfatoethylsulfonyl)-aniline | 1-(2-sulfoethyl)-3-carbamoyl-4-methyl-6-hydroxy-2-pyridone | greenish yellow (412) |
| 11 | 2-methoxy-5-($\beta$-sulfatoethylsulfonyl)-aniline | 1-(2-sulfoethyl)-3-carbamoyl-4-methyl-6-hydroxy-2-pyridone | yellow (432) |
| 12 | 2,5-dimethoxy-4-($\beta$-sulfatoethylsulfonyl)-aniline | 1-(2-sulfoethyl)-3-carbamoyl-4-methyl-6-hydroxy-2-pyridone | reddish yellow (445) |
| 13 | 6-sulfo-8-($\beta$-sulfatoethylsulfonyl)-2-aminonaphthalene | 1-(2-sulfoethyl)-3-carbamoyl-4-methyl-6-hydroxy-2-pyridone | yellow (437) |
| 14 | 3-($\beta$-sulfatoethylsulfonyl)-aniline | 1-(2-sulfoethyl)-4-methyl-6-hydroxy-2-pyridone | greenish yellow (411) |
| 15 | 3-($\beta$-thiosulfatoethylsulfonyl)-aniline | 1-(2-sulfoethyl)-4-methyl-6-hydroxy-2-pyridone | greenish yellow (410) |
| 16 | 3-($\beta$-chloroethylsulfonyl)-aniline | 1-(2-sulfoethyl)-4-methyl-6-hydroxy-2-pyridone | greenish yellow (411) |
| 17 | 3-vinylsulfonyl-aniline | 1-(2-sulfoethyl)-4-methyl-6-hydroxy-2-pyridone | greenish yellow (412) |
| 18 | 3-($\beta$-acetyloxyethylsulfonyl)-aniline | 1-(2-sulfoethyl)-4-methyl-6-hydroxy-2-pyridone | greenish yellow (412) |
| 19 | 3-($\beta$-phosphatoethylsulfonyl)-aniline | 1-(2-sulfoethyl)-4-methyl-6-hydroxy-2-pyridone | greenish yellow (411) |
| 20 | 2-carboxy-5-($\beta$-sulfatoethylsulfonyl)-aniline | 1-(2-sulfoethyl)-4-methyl-6-hydroxy-2-pyridone | greenish yellow (413) |
| 21 | 2-sulfo-5-($\beta$-sulfato- | 1-(2-sulfoethyl)-4- | greenish |

-continued

| Example | Amine of the general formula (5) | Pyridone compound of the general formula (6) | Hue on cotton ($\lambda_{max}$ in nm) |
|---|---|---|---|
|  | ethylsulfonyl)-aniline | methyl-6-hydroxy-2-pyridone | yellow (414) |
| 22 | 6-sulfo-8-($\beta$-sulfatoethylsulfonyl)-2-aminonaphthalene | 1-(2-sulfoethyl)-4-methyl-6-hydroxy-2-pyridone | yellow (433) |
| 23 | 3-($\beta$-sulfatoethylsulfonyl)-aniline | 1-(2-sulfatoethyl)-3-carbamoyl-6-hydroxy-2-pyridone | greenish yellow (414) |
| 24 | 3-($\beta$-sulfatoethylsulfonyl)-aniline | 1-(2-phosphatoethyl)-4-methyl-6-hydroxy-2-pyridone | greenish yellow (410) |
| 25 | 3-($\beta$-sulfatoethylsulfonyl)-aniline | 1-carboxymethyl-3-carbamoyl-6-hydroxy-2-pyridone | greenish yellow (415) |
| 26 | 2,5-dimethoxy-4-($\beta$-sulfatoethylsulfonyl)-aniline | 1-carboxymethyl-3-carbamoyl-6-hydroxy-2-pyridone | reddish yellow (444) |
| 27 | 2-bromo-4-($\beta$-sulfatoethylsulfonyl)-aniline | 1-carboxymethyl-3-carbamoyl-6-hydroxy-2-pyridone | yellow (428) |
| 28 | 1-sulfo-6-($\beta$-sulfatoethylsulfonyl)-2-aminonaphthalene | 1-carboxymethyl-3-carbamoyl-6-hydroxy-2-pyridone | greenish yellow (427) |
| 29 | 1-sulfo-6-($\beta$-sulfatoethylsulfonyl)-2-aminonaphthalene | 1-carboxymethyl-4-methyl-6-hydroxy-2-pyridone | greenish yellow (421) |
| 30 | 1-sulfo-6-($\beta$-sulfatoethylsulfonyl)-2-aminonaphthalene | 1-(2-carboxyethyl)-4-methyl-6-hydroxy-2-pyridone | greenish yellow (421) |
| 31 | 1-sulfo-6-($\beta$-sulfatoethylsulfonyl)-2-aminonaphthalene | 1-(2-carboxyethyl)-3-carbamoyl-4-methyl-6-hydroxy-2-pyridone | greenish yellow (427) |
| 32 | 2-methoxy-5-($\beta$-sulfatoethylsulfonyl)-aniline | 1-(2-carboxyethyl)-3-carbamoyl-4-methyl-6-hydroxy-2-pyridone | yellow (432) |
| 33 | 2-sulfo-5-($\beta$-sulfatoethylsulfonyl)-aniline | 1-(2-carboxyethyl)-3-carbamoyl-4-methyl-6-hydroxy-2-pyridone | greenish yellow (419) |
| 34 | 3-($\beta$-sulfatoethylsulfonyl)-aniline | 1-(2-carboxyethyl)-4-methyl-6-hydroxy-2-pyridone | greenish yellow (412) |
| 35 | 2-methoxy-5-methyl-4-($\beta$-sulfatoethylsulfonyl)-aniline | 1-(2-carboxyethyl)-4-methyl-6-hydroxy-2-pyridone | yellow (432) |
| 36 | 2-bromo-4-($\beta$-sulfatoethylsulfonyl)-aniline | 1-carboxymethyl-4-methyl-6-hydroxy-2-pyridone | greenish yellow (423) |
| 37 | 4-($\beta$-sulfatoethylsulfonyl)-aniline | 1-carboxymethyl-4-methyl-6-hydroxy-2-pyridone | greenish yellow (411) |
| 38 | 1-amino-4-[3'-($\beta$-sulfatoethylsulfonyl)-benzoylamino]-benzene | 1-(2-sulfoethyl)-4-methyl-6-hydroxy-2-pyridone | greenish yellow (421) |
| 39 | 1-amino-4-[2'-nitro-4'-($\beta$-sulfatoethylsulfonyl)-phenylamino]-benzene | 1-(2-sulfoethyl)-3-carbamoyl-4-methyl-6-hydroxy-2-pyridone | yellow (434) |
| 40 | 1-sulfo-6-($\beta$-sulfatoethylsulfonyl)-2-aminonaphthalene | 1-(2-sulfatoethyl)-3-carbamoyl-4-methyl-6-hydroxy-2-pyridone | greenish yellow (426) |
| 41 | 1-sulfo-6-($\beta$-sulfatoethylsulfonyl)-2-aminonaphthalene | 1-(2-phosphatoethyl)-4-methyl-6-hydroxy-2-pyridone | greenish yellow (421) |
| 42 | 1-sulfo-6-vinylsulfonyl-2-aminonaphthalene | 1-(2-sulfoethyl)-4-methyl-6-hydroxy-2-pyridone | greenish yellow (422) |

USE EXAMPLE 1

20 parts of the compound according to the invention (in the form of the sodium salt) of Example 1 are dissolved in 300 parts of water together with 50 parts of urea. The solution is stirred at below 40° C. in 400 parts of a neutral, aqueous 4% strength alginate thickening. 10 parts of sodium carbonate are added, and the entire amount is made up to a total amount of 1,000 parts with the 4% strength aqueous alginate thickening. After thorough stirring, the print paste thus prepared is printed onto a cotton fabric which, after drying at 60° C., is treated in a commercially customary steamer with saturated steam at 100° to 103° C. for 5 minutes. The print thus prepared is then finished by rinsing with cold and hot water, by washing with a neutral detergent and by rinsing once more with water. Drying of the material gives a strong greenish yellow print of very good light fastness and of very good wet fastness properties.

USE EXAMPLE 2

A fabric made of mercerized cotton is padded with an aqueous dyeing liquor at 20° C. which contains per liter 20 g of the sodium salt of the azo compound according to the invention of Example 1 and 18 g of 33% strength aqueous sodium hydroxide solution using a liquor pickup of 80% on weight of fiber. The padded fabric is wound on to a beam, and the package is wrapped in a plastic sheet and is left at room temperature for 8 hours. The fabric is then finished by rinsing with cold water, by treatment with an aqueous bath containing a little acetic acid and by rinsing once more in cold and hot water. Drying gives a strong greenish yellow dyeing of very good light fastness and of very good wet fastness properties.

USE EXAMPLE 3

100 parts of a fabric made of mercerized cotton are treated at 60° C. in 3,000 parts by volume of an aqueous dyebath which contains 5 parts of the sodium salt of the compound according to the invention of Example 1 and also 150 parts of anhydrous sodium sulfate for 10 minutes. This 10-minute treatment is followed by addition of 15 parts of anhydrous sodium carbonate and of 4 parts of 33% strength aqueous sodium hydroxide solution. The dyeing is continued at 60° C. for 60 minutes. The dyed fabric is then finished in conventional manner, such as, for example, that of Use Example 2. This gives a strong greenish yellow dyeing of very good light fastness and of very good wet fastness properties.

USE EXAMPLE 4

100 parts of a wool fabric are introduced into a warm aqueous dyebath at 40° C. which is composed of 3,000 parts of water, 2 parts of the sodium salt of the compound according to the invention described in Example 1, 1.5 parts of an adduct of 12 mol of ethylene oxide on 1 mol of stearylamine, 2 parts of ammonium acetate and 2 parts of 60% strength aqueous acetic acid. The dyeing temperature is raised to the boil in the course of 30 minutes, and the dyeing is then continued at 100° C. for 90 minutes. After the customary washing of and finishing of the resulting wool dye, this wool fabric has a strong greenish yellow hue of very good light fastness and of very good wet fastness properties.

USE EXAMPLE 5

The dyeing method indicated in Use Example 4 is repeated, except that the wool fabric is replaced by 100 parts of a fabric made of an $\epsilon$-polycaprolactam fiber. The result obtained is likewise a strong greenish yellow dyeing of good end-use fastness properties.

The methods of the above use examples can also be used to use the other monoazo compounds according to the invention described in the illustrative embodiments and tabulated examples in dyeing and printing. Using analogous methods, these dyestuffs likewise produce very stong dyeings and prints of good light and wet fastness properties in the hues which are indicated for the respective illustrative embodiment or tabulated example.

I claim:

1. A water-soluble monoazo compound of the formula

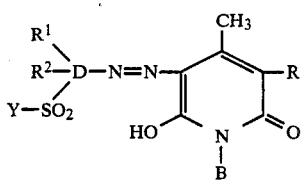

in which:

D is a benzene ring or a naphthalene ring or a radical of the formula (2) or (3)

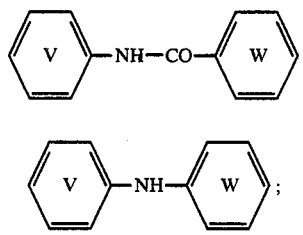

$R^1$ is hydrogen, alkyl of 1 to 4 carbon atoms, alkoxy of 1 bis 4 carbon atoms, hydroxy, nitro or halogen, if D is a benzene ring, and $R^2$ is hydrogen, alkyl of 1 to 4 carbon atoms, alkoxy of 1 to 4 carbon atoms, halogen, carboxy or sulfo, if D is a benzene ring, or $R^1$ is hydrogen, alkyl of 1 to 4 carbon atoms, alkoxy of 1 to 4 carbon atoms, carboxy, halogen, sulfo or a group of the formula —SO$_2$—Y (where Y has the meaning mentioned hereinafter), if D is a naphthalene ring, and $R^2$ is hydrogen or sulfo, if D is a naphthalene ring, or $R^1$ is, if D is a radical of the formula (2), hydrogen, nitro, chlorine or alkoxy of 1 to 4 carbon atoms, and is bonded to the benzene ring V, and $R^2$ is, if D is a radical of the formula (2), hydrogen, chlorine, sulfo, or nitro and is bonded to the benzene ring W, or $R^1$ is, if D is a radical of the formula (3), hydrogen, nitro or sulfo, and is bonded to the benzene ring V, and $R^2$ is, if D is a radical of the formula (3), hydrogen, chlorine or sulfo and is bonded to the benzene ring W;

the group —SO$_2$—Y is bonded in the formulae (2) and (3) to V or W, and the azo group is bonded to W;

Y is vinyl or ethyl substituted in the β-position by a substituent which eliminates as an anion under alkaline conditions;

R is hydrogen or carbamoyl;

B is alkyl of 1 to 4 carbon atoms substituted by one sulfato, phosphato, carboxy or sulfo;

M is hydrogen or an alkali metal;

the moieties B, $R^1$, $R^2$ and R can have meanings which are identical to or different from one another.

2. A compound according to claim 1, in which D is a radical of formula (2) in which $R^2$ is hydrogen.

3. A compound according to claim 1, in which D is a radical of formula (3) in which $R^2$ is hydrogen.

4. A compound according to claim 1, in which D is a radical of formula (2) or (3), to which the group —SO$_2$—Y is bonded at the benzene ring V.

5. A compound according to claim 1, wherein D is a benzene ring, $R^1$ is hydrogen, alkyl group of 1 to 4 carbon atoms, alkoxy of 1 to 4 carbon atoms or chlorine, and $R^2$ is hydrogen, alkyl of 1 to 4 carbon atoms, carboxy or sulfo.

6. A compound according to claim 1, of the formula

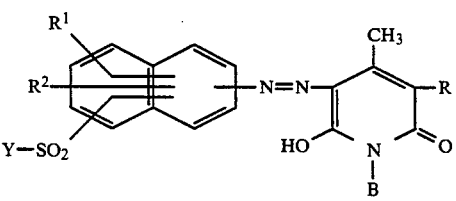

in which $R^1$ is hydrogen or sulfo, $R^2$ is hydrogen or sulfo, and B, R and Y are defined as in claim 1.

7. A compound according to claim 1 of the formula

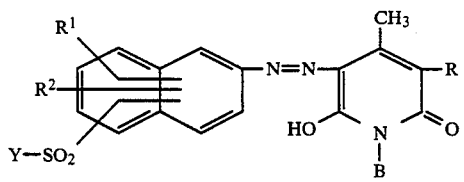

in which $R^1$ is hydrogen or sulfo, $R^2$ is hydrogen or sulfo, and B, R and Y are defined as in claim 1.

8. A compound according to claim 1, of the formula

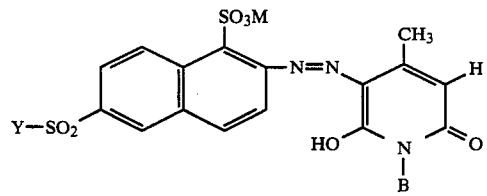

in which B, M and Y are defined as in claim 1.

9. A compound according to claim 1, of the formula

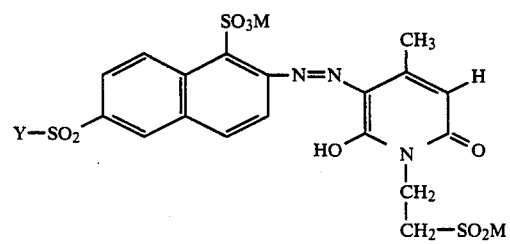

in which M and Y are defined as in claim 1.

10. A compound according to claim 1, of the formula

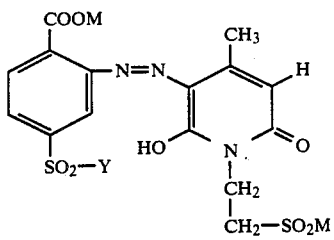

in which M and Y are defined as in claim 1.

11. A compound according to claim 1, wherein B is alkyl of 1 to 3 carbon atoms substituted by one sulfo or carboxy.

12. A compound according to claim 1, wherein B is β-sulfoethyl.

13. A compound according to claim 4, wherein B is β-sulfoethyl.

14. A compound according to claim 7, wherein B is β-sulfoethyl.

15. A compound according to claim 1, wherein R is hydrogen.

16. A compound according to claim 7, wherein R is hydrogen.

17. A compound according to claim 11, wherein R is hydrogen.

18. A compound according to claim 12, wherein R is hydrogen.

19. A compound according to claim 1, wherein Y is vinyl, β-thiosulfatoethyl, β-phosphatoethyl, β-chloroethyl, β-($C_2$–$C_5$-alkanoyloxy)-ethyl or β-sulfatoethyl.

20. A compound according to claim 1, wherein Y is vinyl or β-sulfatoethyl.

* * * * *